Feb. 15, 1966   H. S. V. JARUND   3,235,063
PROTECTIVE SHEATHS FOR THERMOMETERS
Filed Feb. 11, 1963   2 Sheets-Sheet 1

INVENTOR
Harry S. V. Jarund
BY
Stevens, Davis, Miller & Mosher
ATTORNEYS

Feb. 15, 1966     H. S. V. JARUND     3,235,063
PROTECTIVE SHEATHS FOR THERMOMETERS
Filed Feb. 11, 1963     2 Sheets-Sheet 2
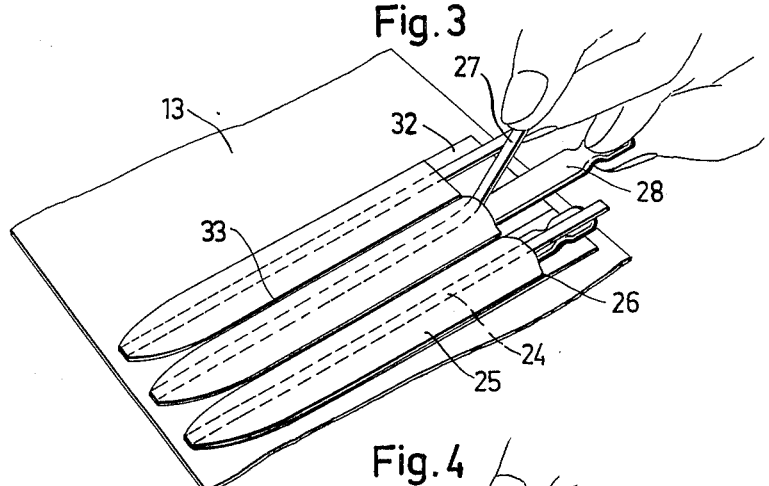
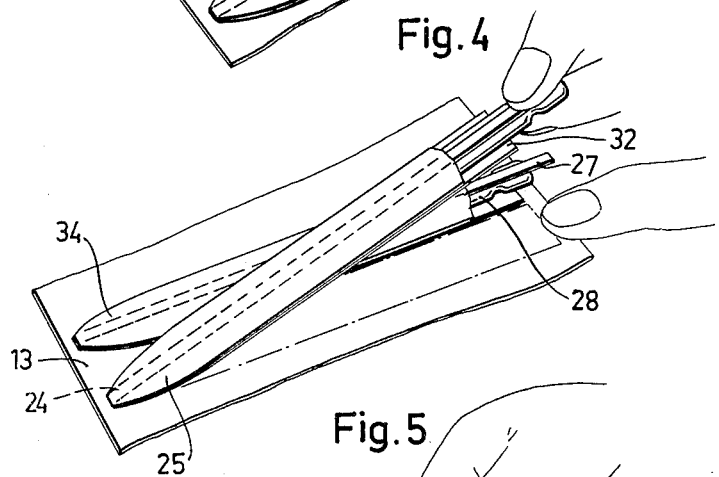
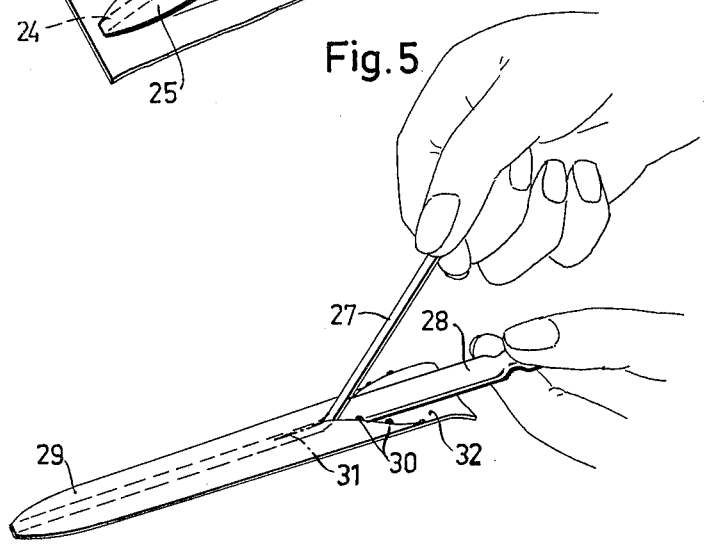
INVENTOR
Harry S. V. Jarund
BY
Stevens, Davis, Miller & Mosher
ATTORNEYS

United States Patent Office 3,235,063
Patented Feb. 15, 1966

3,235,063
PROTECTIVE SHEATHS FOR THERMOMETERS
Harry Sigurd Valdemar Jarund, Otto Linbladsvagen 18, Lund, Sweden
Filed Feb. 11, 1963, Ser. No. 257,544
Claims priority, application Sweden, Feb. 14, 1962, 1,614/62
4 Claims. (Cl. 206—16.5)

The present invention relates to protective sheaths of supple plastic foil for thermometers, such as clinical thermometers.

Protective sheaths for clinical thermometers consisting of a transparent elastic material, of a shape at least partially similar to that of the thermometer, are already known. Such sheaths are usually formed so that the lower closed end of the sheath when drawn off the thermometer after taking of the temperature remains adhered to the lower end of the thermometer so that, in being drawn off, the sheath is not torn but is pulled inside out. In this way the outside of the lower end of the sheath, which may have been infected during the taking of the temperature, will be turned inwards in the process of being pulled off, so effectively preventing the infection of nursing personnel or other persons. Such sheaths, however, have the disadvantage that it has not hitherto been possible to insert the thermometers into them in a rapid and simple manner for which reason these otherwise efficient sheaths have not found a practical use in hospitals or similar institutions.

It is an object of the present invention to provide a sheath arrangement which permits the thermometer to be conveniently and quickly inserted in the sheath.

According to the invention there is provided a pack of sheaths of flexible plastic foil for thermometers or the like such pack comprising a web to which sheaths are detachably affixed to lie side by side, the web, by holding the sheaths in an outstretched condition, facilitating the introduction of the thermometers into the sheaths. Thus in use of the pack according to this invention, instead of it being necessary to attempt to push a thermometer into an individual sheath, the latter may simply be inserted into a sheath on the web, the latter serving to hold the sheath in an outstretched condition during this insertion. After the thermometer has been inserted in the sheath, the latter can be easily removed from the endless band by raising the thermometer and sheath, whereupon the adhesion between the web and sheath is broken. A further advantage of the pack according to the invention is that the lower end of the sheath is not touched and thus does not become infected. The proposed form of pack also makes it easy to make up reserve packs with thermometers placed in sheaths in advance while the sheaths are still attached to the web.

Preferably adjacent sheaths have at least partially coincident common sealed side joints formed, for example, by heat sealing so as to be separable from one another. Desirably the pack includes inverting devices consisting of a pulling strip arranged in the interior of each sheath and extending from its closed to its open end, such strip being rigidly affixed at the closed end of the sheath and of a length substantially equal to the length of the sheath.

According to another aspect of the invention there is provided a method of producing the pack of the invention wherein a first plastic strip, a second plastic strip and the web are brought together and the resulting composite band are sealed together to produce sheaths situated side by side, the sheaths being individually detachable from one another and from the web and adhering lightly to the web at least along the welded seams joining each pair of sheaths.

According to a further aspect there is provided apparatus for effecting such method wherein a main roll is arranged so as continuously to feed forward the pack consisting of the two plastic strips and the web to a reel via a heat-sealing and punching device continuously acting upon the pack and arranged on the main roll.

The invention will now be described with reference to the attached drawings.

FIGS. 3–5 show a multiple pack when thermometers are being introduced into the sheaths.

Figure 1:
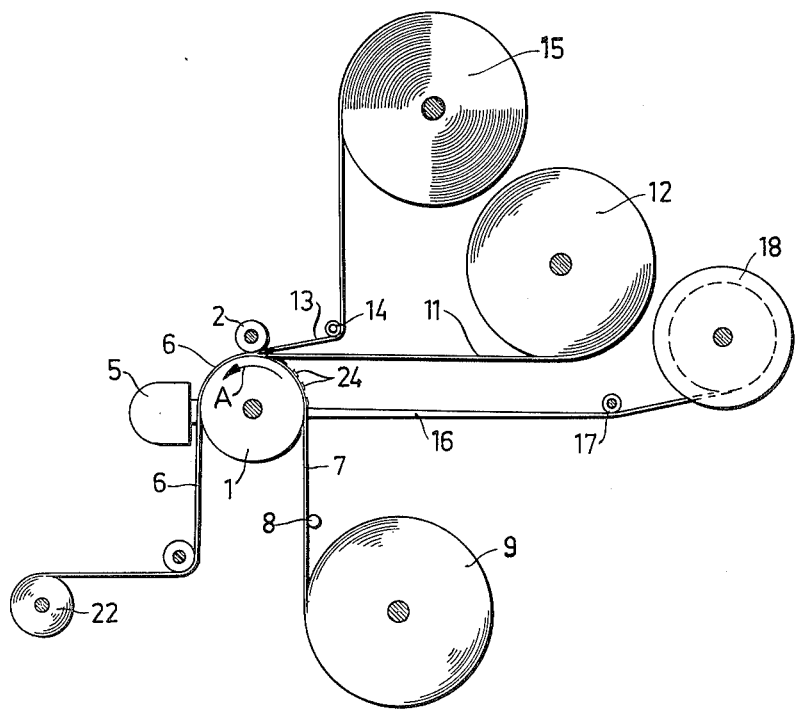
FIG. 1 shows schematically a device for producing the multiple pack according to this invention.
Figure 2:
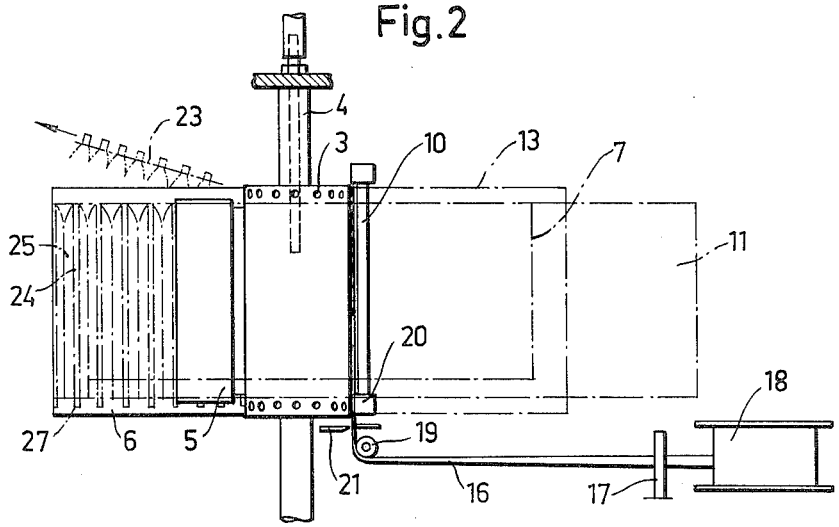
FIG. 2 shows the same device viewed from above.

A main roll 1 preferably coated with rubber or the like, driven by a driving roll 2 rotates in the direction of the arrow A. At the two ends of the main roll 1 are openings 3 regularly spaced around the circumference of the roll which are connected to a vacuum generator not shown on the drawing, via the inside of the roll and shaft 4 of the main roll. A heat-sealing and punching device 5 is pressed at regular intervals against a band 6 which is fed forward on the main roll and consists of:

(1) a first plastic strip 7 which is continuously reeled off a reel 9 via a guide roller 8 and to which, while on the main roll, are affixed thin plastic strips spaced at regular intervals perpendicular to the length of the plastic strip, the strips being cut and applied to the band by a cutting and feeding device 10, (2) a second plastic strip 11 which is fed from a reel 12 to the main roll 1 and is applied over the first plastic strip 7, and (3) a paper web 13 which is led via a guide roll 14 to the main roll from a reel 15. The cutting device 10 is fed with a thin plastic strip 16 via a guide roll 17 from a reel 18. The thin plastic strip 16 is turned around the guide roll 19 and is in due course cut off by a knife 21, i.e. when the driver 20 on the cutting device 10 has fed the required length into the cutting device. The band 6 with sheaths is finally wound onto a reel 22. Before the processed band 6 is wound onto reel 22, the waste portion 23 at the lower closed end of the sheaths is removed.

The device operates as follows:

From reel 9 the first plastic strip 7 is brought via a guide roll 8 to the main roll 1. As soon as the first plastic strip 7 has come into contact with the main roll, pulling strips are applied which are cut off by the cutting and feeding device 10 from the thin plastic strip 16 at right angles to the length of the first plastic strip 7. The pulling strips 24 conveyed from the cutting and feeding device 10 to the main roll 1 are held on the main roll during the movement to the sealing device 5 by means of openings 3 in the main roll which are connected to a vacuum generator, the width of the main roll 1 exceeding the width of the first plastic strip 7 so that the openings 3 to the vacuum generator can hold fast the pulling strip 24 delivered to the main roll. After the pulling strips 24 have been applied to the first plastic strip 7, the second plastic strip 11, which is rather wider than the first plastic strip 7, is taken to the main roll 1, and above plastic strip 11 there is applied a paper web 13 which is at least as wide as plastic strip 11. The so assembled band 6 is continuously carried by the rotation of the main roll 1 towards the sealing device 5, the sealing and punching jaws of which are so shaped that they continuously form sheaths out of band 6 with one end rounded and closed, the lower end of the pulling strip being at the same time attached to the closed end of the sheath. The sealing device 5 is thus brought continuously into contact with the band 6 fed forward over roll 1, thus processing the band in such a way as to produce sheaths lying close together, each of which is furnished with its pulling strip. Since, during the jointing and separating operation, the paper web 13 lies against the sealing device, the sheaths are detachably affixed to the paper web along the sealing edges 33. The sealing and punching device 5 may suitably be designed so as to produce a greater punching effect at the closed, rounded end 34 of the sheath, so enabling the waste portion there to be easily removed. The thus moulded band 6 is then continuously wound onto reel 22 after prior removal of the waste portion 23 arising at the closed end of the sheaths.

FIG. 3 shows a multiple pack in band form made in accordance with the invention and consisting of paper web 13 to which sheaths 25 are detachably affixed. Every sheath has a pulling strip 24 projecting from the open end 26 of the sheath. For introduction of the thermometer 28 the projecting portion 27 of the pulling strip is raised away from the paper web 13, whereby the open end 26 of the sheath is extended to permit a thermometer to be more easily inserted. After insertion of the thermometer, the entire sheath and thermometer can be easily removed from the paper web 13, for example by twisting or raising of the thermometer in the sheath as shown in FIG. 4.

Another way of facilitating insertion of the thermometer in the sheath is, as shown in FIG. 5, to arrange a slit 31 extending from the open end of the sheath on the side away from the paper web 13 towards the closed end 29 of the sheath, which may be conveniently held together by spot welds 30 spaced at regular intervals, which can be successively torn up by pulling the pulling strip 24. The length of the slit should preferably not exceed half the length of the sheath, as difficulties may otherwise arise in inverting the sheath. The slit 31 may suitably be formed before the plastic strip 7 reaches the main roll 1. It has proved advisable to place the spot weld nearest to the open end of the sheath at some distance from the open end. This precludes the necessity for tearing the perforation when introducing the thermometer in the sheath. The main object of spot welds in the slit is to facilitate the pulling of the sheath off the thermometer. Thus, when drawing the sheath off the thermometer, the extension flap is pulled outwards and downwards towards the closed end of the sheath while at the same time the upper end 27 of the pulling strip remains held to the upper end of the thermometer, whereby the slit portion of the sheath above each spot weld is retarded by the spot weld before that portion of the sheath is torn off and turned inside out.

The invention is not restricted to the embodiment illustrated in the drawings but may be varied in many ways within the scope of the subsequent claims. For instance, neither pulling strips 27 nor slits 31 need be included. Nor is it necessary that the open end of the sheath is formed into an extension flap 32. The open end of the sheath may, for instance, be furnished with a funnel-shaped termination for initiation of the inversion operation. The sheaths need not be located side by side at right angles to the length of the paper web but may equally well be arranged in the same way in one or more rows one after the other in the longitudinal direction of the paper web.

The web consists preferably of a thin, slightly porous, paper. This prevents the plastic strips from becoming stuck to the sealing device and ensures a certain adhesion of the welded seams to the plastic since, during the sealing operation, the plastic penetrates to some extent into the surface of the paper web. Other materials may, of course, be used, in which case the adhesion of the sheaths may be accomplished by spot welds or the like. For the production of a multiple pack in which no form of extension flap is desired at the open end of the sheath, the web and strips should preferably be equal in width.

I claim:
1. A pack of sheaths for thermometers comprising a continuous backing web, a plurality of narrow elongated thermometer sheaths detachably secured to said backing web, each of said sheaths having two walls of flexible plastic film joined together along substantially parallel spaced-apart edges and at one end by heat seals, each of said sheaths thus having a closed end and an open end, said plurality of sheaths being detachably secured to said web by said heat seals and being individually detachable from said web, and said web underlying substantially the entire area of said plurality of sheaths adjacent said open ends and retaining the wall secured to the web in flattened condition at said open end portions to facilitate inserting thermometers into said open ends, and a thermometer in each of said sheaths.

2. A pack according to claim 1 wherein said web is a thin, slightly porous paper and said thermometer sheaths are adhered thereto by peneration of the plastic film into said porous paper at said heat seals.

3. A pack according to claim 1 comprising means on each sheath for holding the closed end adjacent the thermometer to facilitate stripping the sheath from the thermometer and turning it inside out after use and wherein the wall of each of said sheaths remote from said backing web has spaced-apart longitudinal slits formed therein extending from adjacent the open end thereof to a point at a distance not exceeding one-half the length of said sheaths from said open end, thereby forming a pair of wall sections, the wall sections on opposite sides of said slits being connected together at spaced-apart locations between said slits to retain the wall segments on opposite sides of said slits together until after the portions between each of such locations and the said open end of said sheath have been turned inside out when the sheath is being removed from the thermometer after use.

4. A pack according to claim 3, wherein one of said slits in each of said sheaths extends from the end of said remote wall at the open end to a point spaced therefrom to facilitate opening the sheath to receive the thermometer.

References Cited by the Examiner

UNITED STATES PATENTS

| | | |
|---|---|---|
| 683,790 | 10/1901 | Parmenter. |
| 890,424 | 6/1908 | Henry. |
| 1,286,877 | 12/1918 | Graham. |
| 1,764,569 | 6/1930 | Knee _____ 229—69 X |
| 2,013,844 | 9/1935 | Sherman _____ 229—69 |
| 2,028,341 | 1/1936 | Masterson _____ 229—69 |
| 2,306,335 | 12/1942 | Feigenbutz. |
| 2,332,638 | 10/1943 | Heywood _____ 229—69 |
| 2,334,413 | 11/1943 | Kerr _____ 229—85 X |
| 2,653,752 | 9/1953 | Vogt _____ 229—69 |
| 2,679,280 | 5/1954 | Marsh _____ 156—515 |
| 2,684,807 | 7/1954 | Gerrish _____ 229—51 |
| 2,769,533 | 11/1956 | Booth _____ 206—56 |
| 2,790,593 | 4/1957 | Reuter _____ 229—69 |
| 2,824,596 | 2/1958 | Crawford _____ 156—515 |
| 2,824,686 | 2/1958 | Hamilton _____ 229—69 |
| 2,910,174 | 10/1959 | Reid _____ 206—16 |
| 2,915,175 | 12/1959 | Diamant _____ 206—16 |
| 2,923,456 | 2/1960 | Ryan. |
| 2,969,141 | 1/1961 | Katzin _____ 206—16 |
| 3,056,712 | 10/1962 | Imhof _____ 156—306 |
| 3,062,698 | 11/1962 | Aykanian _____ 156—306 |
| 3,086,647 | 4/1963 | Krezanoski _____ 206—56 |

LOUIS G. MANCENE, *Primary Examiner.*

EARLE J. DRUMMOND, THERON E. CONDON,
*Examiners.*